United States Patent
Ure

(10) Patent No.: US 8,160,558 B2
(45) Date of Patent: Apr. 17, 2012

(54) CELLPHONE EXTENSIONS

(76) Inventor: Michael J. Ure, Cupertino, CA (US)

( * ) Notice: Subject to any disclaimer, the term of this patent is extended or adjusted under 35 U.S.C. 154(b) by 739 days.

(21) Appl. No.: 12/029,578

(22) Filed: Feb. 12, 2008

(65) Prior Publication Data

US 2009/0203362 A1     Aug. 13, 2009

(51) Int. Cl.
    *H04M 3/42* (2006.01)
(52) U.S. Cl. ........................ 455/415; 455/567
(58) Field of Classification Search ........... 455/415, 455/567
    See application file for complete search history.

(56) References Cited

U.S. PATENT DOCUMENTS

| | | | | |
|---|---|---|---|---|
| 5,559,860 A * | 9/1996 | Mizikovsky | ................ | 455/413 |
| 6,018,671 A * | 1/2000 | Bremer | ................ | 455/567 |
| 6,148,213 A * | 11/2000 | Bertocci et al. | ................ | 455/462 |
| 6,195,544 B1 * | 2/2001 | Shimazaki | ................ | 455/412.2 |
| 6,606,508 B2 * | 8/2003 | Becker et al. | ................ | 455/567 |
| 6,813,344 B1 * | 11/2004 | Lemke | ................ | 379/142.06 |
| 6,842,622 B2 * | 1/2005 | Peters et al. | ................ | 455/458 |
| 2002/0025831 A1 * | 2/2002 | Kim | ................ | 455/554 |
| 2004/0127263 A1 * | 7/2004 | Vegh | ................ | 455/567 |
| 2004/0198461 A1 * | 10/2004 | Coombes | ................ | 455/567 |
| 2004/0203794 A1 * | 10/2004 | Brown et al. | ................ | 455/445 |
| 2005/0143054 A1 * | 6/2005 | Fogel | ................ | 455/415 |

* cited by examiner

*Primary Examiner* — Charles Shedrick

(57) ABSTRACT

Extensions are provided for mobile electronic devices including cellphones, wherein different extensions may correspond to different communication contexts. In an exemplary embodiment, a call is answered using an automated answering system. The caller is requested to enter an extension number. In response to the extension number, a call alert (such as a ring tone) unique to that extension is activated.

10 Claims, 3 Drawing Sheets

CELLPHONE EXTENSIONS

BACKGROUND

1. Field of the Invention

The present invention relates to mobile electronic devices such as cellphones.

2. State of the Art

With the widespread adoption of cellphones, increasing numbers of users rely exclusively on their cellphones for voice communications. A user, however, will typically have several distinct communication contexts: e.g., work, family, outside business, etc. If the cellphone is equipped with caller-ID (CID), the context of the call may be determined some of the time. Depending on the caller (e.g., frequent or first-time), determining the context using CID may require minimal effort and take an instant or an appreciable effort and take a few moments. Answering of the call may be rushed, without sufficient opportunity to prepare for the context of the call as may be desired.

SUMMARY

The present invention, generally speaking, provides extensions for mobile electronic devices including cellphones, wherein different extensions may correspond to different communication contexts. In an exemplary embodiment, a call is answered using an automated answering system. The caller is requested to enter an extension number. In response to the extension number, a call alert (such as a ring tone) unique to that extension is activated.

DESCRIPTION OF DRAWING

The foregoing may be further understood from the following description in conjunction with the appended drawing. In the drawing.

DETAILED DESCRIPTION

Figure 1:
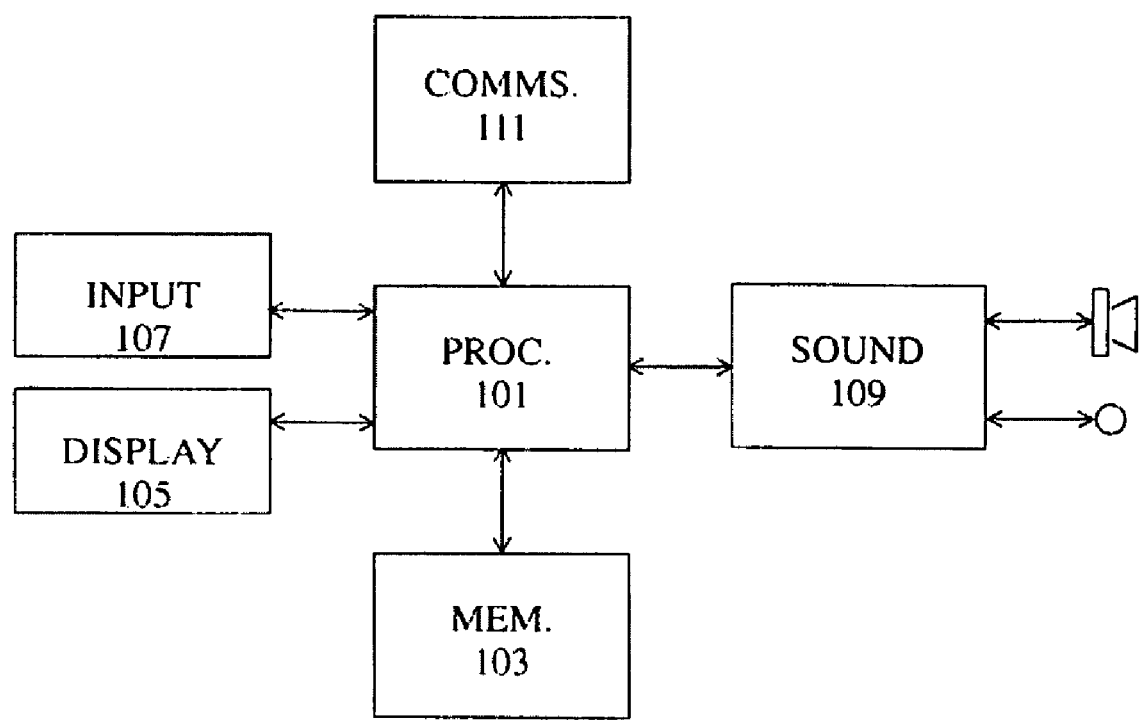
FIG. 1 is a block diagram of a mobile electronic device in which the invention may be used.

Referring now to FIG. 1, a block diagram is shown of a mobile electronic device in which the invention may be used. A processor 101 is coupled to memory 103, to a display sub-system 105, and to an input sub-system 107. The processor is also coupled to a sound sub-system 109 and a communications sub-system 111.

Figure 2:
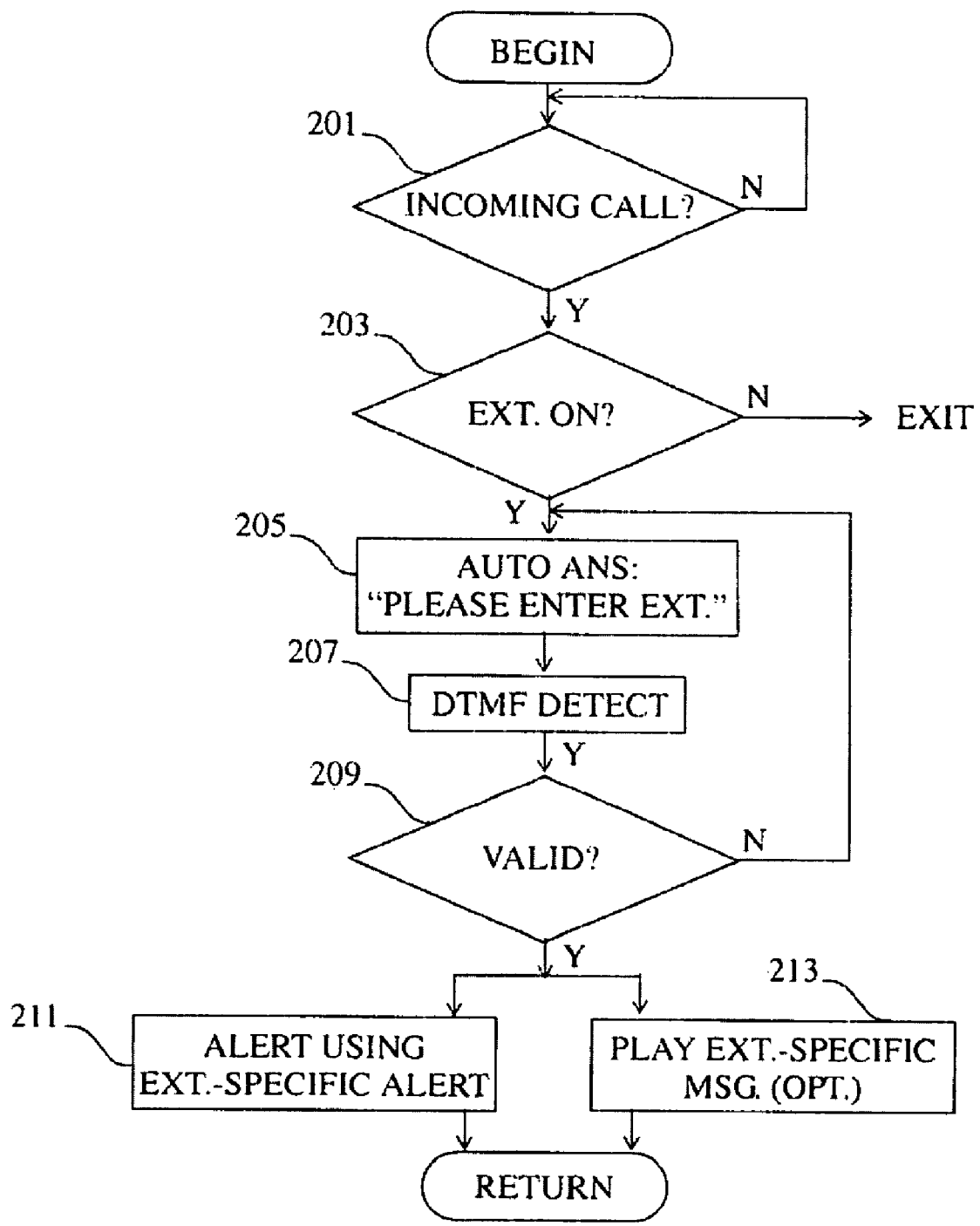
FIG. 2 is a flowchart illustrating call handling by the mobile electronic device of FIG. 1.

Referring to FIG. 2, call handling of the mobile electronic device of FIG. 1 will be described. In step 201, the program check to see whether an incoming call is being received. The mobile electronic device may have extensions turned on or turned off in accordance with user settings. If extensions are turned on (Step 203), then an automatic answering routine answers the call (Step 205) and prompts the caller to enter an extension number. This prompt may be recorded by the user in the user's own voice or downloaded, in which case the prompt may be professionally recorded. The prompt may or may not describe available extensions. If not, then a type of call screening occurs by default. The caller then enters an extension number, and the mobile electronic device, using, for example DTMF detection (Step 207), determines the entered extension number. If the extension number is not a valid one (Step 209), the caller is re-prompted to enter a valid extension number. If after some number of times a valid extension number is not received, the call may then be terminated with a polite "goodbye."

If a valid extension number is received, then the mobile electronic device produces a call alert (Step 211); for example, it produces a ring using an extension-specific ring tone. Alternatively, the same ring tone may be used for all extension numbers, but with the extension number (together with a user description of that extension, if desired) being displayed so as to be visible to the user prior to answering the call.

Optionally, the mobile electronic device may in addition play an extension-specific message to the caller (Step 213). For example, the message might say, "Thank you for calling Gumball International. Your call will answered momentarily. Please hold." The user might answer the call in the midst of the message, in which case it continues to play to completion, after which the user may say hello. The user might answer the call after delay following completion of the message, in the same manner. Or, a time limit may expire without the user answering the call, in which case a follow-on message may apologize and prompt the caller to leave a message. Such operation provide the user an opportunity to complete a task or extricate him or herself from a conversation if needed in order to take a call.

Figure 3:
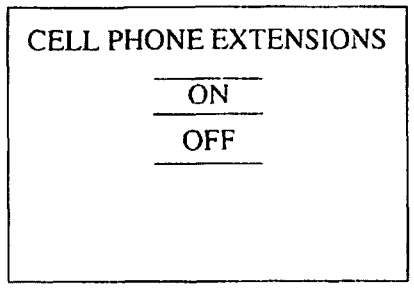
FIG. 3 is an example of an extensions setup screen.

FIG. 3 shows an example of an extensions setup screen. Using this screen, the user is able to turn extensions on or off.

Figure 4:
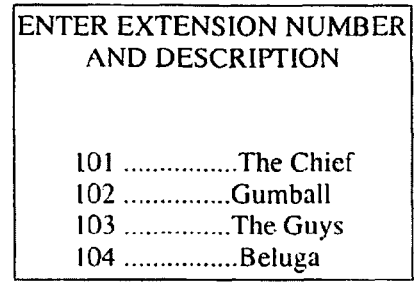
FIG. 4 is an example of another extensions setup screen.

FIG. 4 shows another example of an extensions setup screen. Using this screen, the user enters extension numbers and associated descriptive text.

Figure 5:
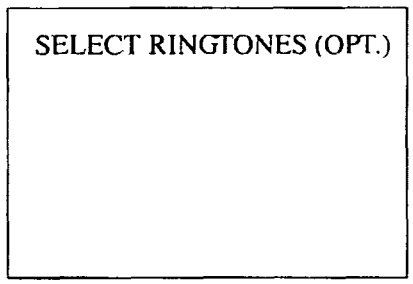
FIG. 5 is an example of another extensions setup screen.

FIG. 5 shows another example of an extensions setup screen. This screen represents the ability of the user to associate distinctive ring tones with each specified extension number.

Figure 6:
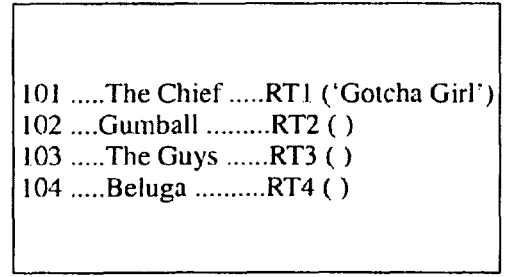
FIG. 6 is an example of another extensions setup screen.

FIG. 6 shows another example of an extensions setup screen. As depicted in this screen, call setup is complete, and each specified extension has associated with it both descriptive text and a distinctive ringtone. In the case of any particular extension number, it may have associated only descriptive text, only a distinctive ringtone, or both.

In alternative embodiments, the extensional functionality described may be realized in the network instead of in the handset, with setup being accomplished through the internet. Extension information may be transmitted using caller-ID (CID) or similar mechanisms. In the case of CID, the extension information may be transmitted following the first ring signal. If desired, the mobile electronic device may be programmed to suppress the first ring signal prior to the receipt of extension information. In this embodiment, extensions become a value-added service offered by service providers.

It will be appreciated by those of ordinary skill in the art that the present invention can be embodied in other specific forms without departing from the spirit or essential character thereof. The described embodiments are therefore considered in all respects to be illustrative and not restrictive. The scope of the invention is given by the appended claims, not the foregoing description, and all changes which come within the meaning and range of equivalents thereof are intended to be embraced therein.

What is claimed is:

1. A method of calling a handheld mobile electronic device, comprising the handheld mobile electronic device:

automatically answering a call;

prompting a caller to enter an extension number, the extension number being communicated to the handheld mobile electronic device; and in response to the extension number, producing a distinctive call alert to a user of the handheld mobile electronic device.

2. A handheld mobile electronic device, comprising:

means for automatically answering a call;

means for prompting a caller to enter an extension number, the extension number being communicated to the handheld mobile electronic device; and means for, in response to the extension number, producing a distinctive call alert to a user of the handheld mobile electronic device.

3. A handheld mobile electronic device, comprising:

circuitry for automatically answering a call;

circuitry for prompting a caller to enter an extension number, the extension number being communicated to the handheld mobile electronic device; and circuitry for, in response to the extension number, producing a distinctive call alert to a user of the handheld mobile electronic device.

4. A method of providing extensions to a handheld mobile electronic device for receiving different types of calls, comprising:

the handheld mobile electronic device receiving a call;

the handheld mobile electronic device automatically answering the call and prompting a caller to enter an extension;

detecting the entered extension; and performing call annunciation in a manner that distinguishes which extension has been entered.

5. A handheld mobile electronic device that provides extensions for receiving different types of calls, comprising:

means for the handheld mobile electronic device receiving a call;

means for the handheld mobile electronic device automatically answering the call and prompting a caller to enter an extension:

means for detecting the entered extension: and means for performing call annunciation in a manner that distinguishes which extension has been entered.

6. The method of claim 4, wherein the handheld mobile electronic device is a cellular telephone.

7. The handheld mobile electronic device of claim 5, wherein the handheld mobile electronic device is a cellular telephone.

8. The method of claim 1, wherein the handheld mobile electronic device is a cellular telephone.

9. The handheld mobile electronic device of claim 2, wherein the handheld mobile electronic device is a cellular telephone.

10. The handheld mobile electronic device of claim 3, wherein the handheld mobile electronic device is a cellular telephone.

* * * * *